(12) United States Patent
Shafferkoetter et al.

(10) Patent No.: US 12,365,062 B2
(45) Date of Patent: Jul. 22, 2025

(54) METERING VALVE FOR ABRASIVE MEDIA

(71) Applicant: Clementina Clemco Holdings, Inc., Washington, MO (US)

(72) Inventors: Ernest Gale Shafferkoetter, Villa Ridge, MO (US); Thomas E. Enger, Washington, MO (US); Anthony James Regna, Pacific, MO (US)

(73) Assignee: Clementina Clemco Holdings, Inc., Washington, MO (US)

( * ) Notice: Subject to any disclaimer, the term of this patent is extended or adjusted under 35 U.S.C. 154(b) by 0 days.

(21) Appl. No.: 18/589,849

(22) Filed: Feb. 28, 2024

(65) Prior Publication Data

US 2024/0198486 A1 Jun. 20, 2024

Related U.S. Application Data

(63) Continuation of application No. 17/969,860, filed on Oct. 20, 2022, now Pat. No. 11,931,864.

(60) Provisional application No. 63/262,795, filed on Oct. 20, 2021.

(51) Int. Cl.
*B24C 7/00* (2006.01)
*F16K 3/24* (2006.01)
*F16K 31/122* (2006.01)

(52) U.S. Cl.
CPC .............. *B24C 7/0053* (2013.01); *F16K 3/24* (2013.01); *F16K 31/1221* (2013.01)

(58) Field of Classification Search
CPC ....... B24C 7/00; B24C 7/0007; B24C 7/0015; B24C 7/0053; F16K 1/523; F16K 31/363; F16K 31/145

See application file for complete search history.

(56) References Cited

U.S. PATENT DOCUMENTS

| | | | |
|---|---|---|---|
| 3,175,473 | A | 3/1965 | Boteler et al. |
| 3,199,844 | A | 8/1965 | Moore et al. |
| 3,415,418 | A | 12/1968 | Van Tuyl |
| 4,075,789 | A | 2/1978 | Dremann |
| 4,322,058 | A | 3/1982 | Thompson et al. |
| 4,339,897 | A | 7/1982 | Thompson et al. |

(Continued)

FOREIGN PATENT DOCUMENTS

GB 2296534 B 12/1996

OTHER PUBLICATIONS

International Search Report and Written Opinion dated Feb. 15, 2023 relating to PCT Application No. PCT/US2022/47223, 10 pages.

(Continued)

*Primary Examiner* — Daphne M Barry

(74) *Attorney, Agent, or Firm* — Stinson LLP

(57) ABSTRACT

A metering valve for introducing media into a pressurized fluid includes media passaging having a media inlet for receiving media and a media outlet for dispensing media toward the pressurized fluid. The media passaging defines a flow path extending from the media inlet to the media outlet and is configured to permit flow of media along the flow path. A plunger, including a plunger head, is movable between a closed position in which the plunger head forms a seal to prevent flow of media through the media passaging and an open position in which the plunger head permits flow of media through the media passaging. The seal formed by the plunger head includes a first sealing interface and a second sealing interface downstream along the flow path of the first sealing interface.

31 Claims, 5 Drawing Sheets

(56) References Cited

U.S. PATENT DOCUMENTS

| | | |
|---|---|---|
| 4,493,336 A | 1/1985 | Renfro |
| 4,518,145 A | 5/1985 | Keltz et al. |
| 4,735,021 A | 4/1988 | Smith |
| 5,123,436 A | 6/1992 | Koechlein et al. |
| 5,239,751 A | 8/1993 | Kanamaru et al. |
| 6,302,660 B1 | 10/2001 | Kurita et al. |
| 6,607,175 B1 | 8/2003 | Nguyen et al. |
| 6,905,108 B2 | 6/2005 | Hall et al. |
| 6,948,517 B2 | 9/2005 | Fukano et al. |
| 7,300,336 B1 | 11/2007 | Nguyen |
| 7,549,911 B2 | 6/2009 | Nguyen |
| 8,505,583 B2 | 8/2013 | Yie |
| 8,827,243 B2 | 9/2014 | Nguyen |
| 9,446,500 B2 | 9/2016 | Miller |
| 9,528,623 B2 | 12/2016 | Jantz et al. |
| 2002/0083981 A1 | 7/2002 | Thompson et al. |
| 2005/0109974 A1 | 5/2005 | Antunes Guimaraes et al. |
| 2008/0191157 A1 | 8/2008 | Nguyen |
| 2015/0362079 A1 | 12/2015 | Nguyen et al. |
| 2019/0277426 A1 | 9/2019 | Bellato et al. |
| 2021/0252670 A1 | 8/2021 | Shafferkoetter et al. |

OTHER PUBLICATIONS

International Search Report and Written Opinion dated Jun. 23, 2021 relating to PCT Application No. PCT/US21/17526, 16 pages.

METERING VALVE FOR ABRASIVE MEDIA

CROSS-REFERENCE TO RELATED APPLICATION

This application is a continuation of U.S. Nonprovisional patent application Ser. No. 17/969,860, filed Oct. 20, 2022, and claims priority to U.S. Provisional Application No. 63/262,795, filed Oct. 20, 2021, the entirety of each of which are hereby incorporated by reference.

FIELD

The present disclosure generally relates to metering valves. More particularly, the disclosure relates to metering valves for abrasive media.

BACKGROUND

Metering valves for abrasive media (e.g., media control valves) are used to control the flow of a media from a vessel containing the media into a pressurized fluid stream. Metering valves are typically used in abrasive blasting applications where the media, such as steel grit, glass, garnet, aluminum, etc., is introduced into the pressurized fluid stream, such as pressurized (e.g., compressed) air, which forcibly propels the media against a surface of an object.

SUMMARY

In one aspect, a metering valve for introducing media into a pressurized fluid comprises a housing and media passaging extending through the housing. The media passaging includes a media inlet for receiving media and a media outlet for dispensing media toward the pressurized fluid. The media passaging defines a flow path extending from the media inlet to the media outlet and is configured to permit flow of media along the flow path. A plunger is movably disposed within the housing. The plunger includes a plunger head. The plunger is movable between a closed position in which the plunger head forms a seal to prevent flow of media through the media passaging and an open position in which the plunger head permits flow of media through the media passaging. The seal formed by the plunger head when the plunger is in the closed position includes a first sealing interface at a first location on the flow path and a second sealing interface at a second location on the flow path. The second location is downstream along the flow path of the first location.

In another aspect, a metering valve for introducing media into a pressurized fluid comprises a housing and media passaging extending through the housing. The media passaging includes a media inlet for receiving the media from a supply of media and a media outlet for dispensing media from the metering valve into the pressurized fluid. A valve seat defines a portion of the media passaging. The valve seat includes a rib. A plunger is movable in the housing and includes a plunger head. The plunger is movable between a closed position in which the plunger head sealingly contacts the rib of the valve seat to prevent flow of media through the media passaging and an open position in which the plunger head is spaced apart from the rib of the valve seat to permit media to flow through the valve passaging. The plunger is movable distally to move the plunger head toward the valve seat to the closed position, the plunger head including a sealing surface configured to press distally against the rib of the valve seat in the closed position for sealingly contacting the rib of the valve seat in the closed position.

Other objects and features will be in part apparent and in part pointed out hereinafter.

BRIEF DESCRIPTION OF THE DRAWINGS

Corresponding parts are indicated by corresponding reference characters throughout the several views of the drawings.

DETAILED DESCRIPTION

Figure 1:
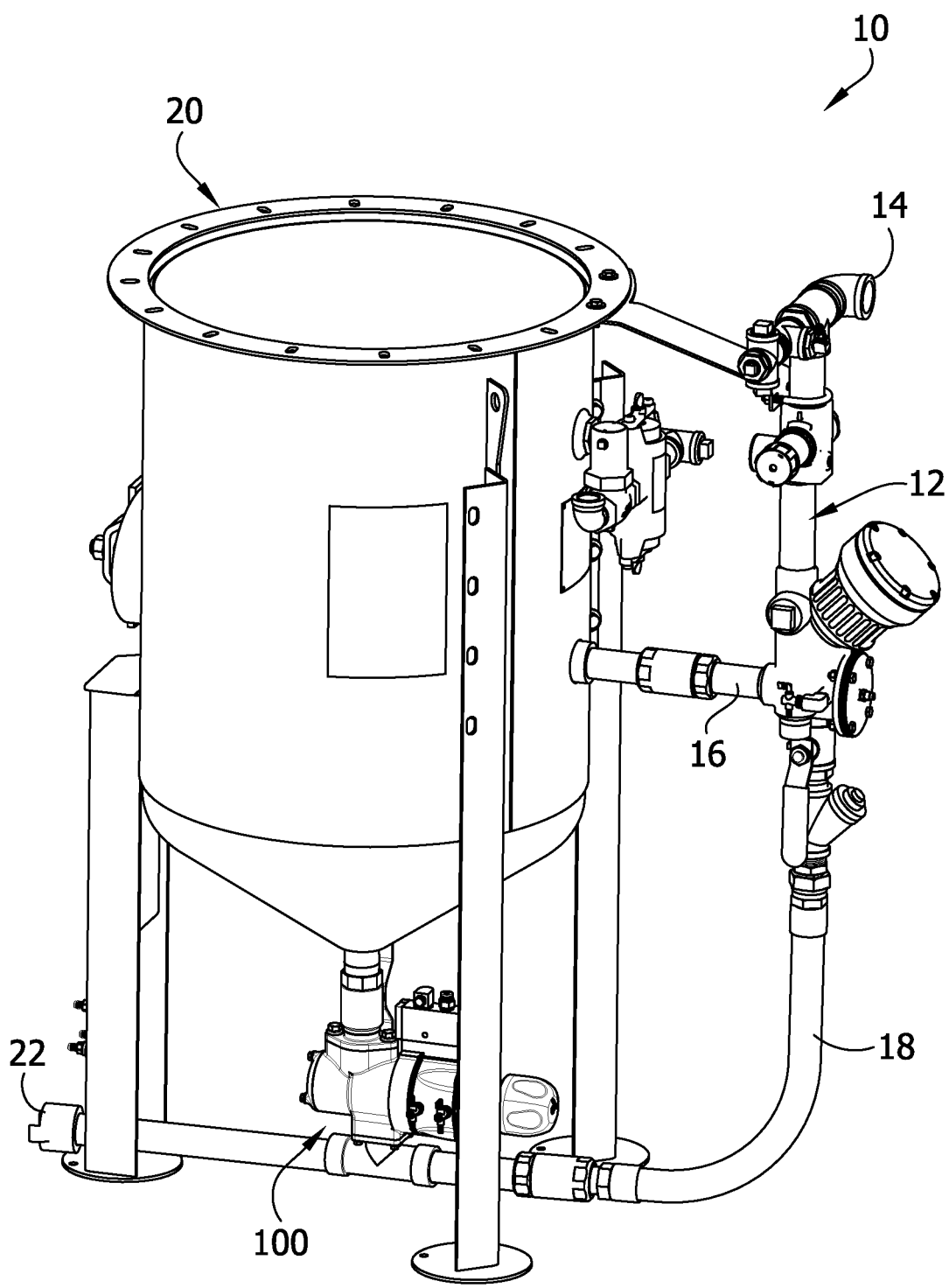
FIG. 1 is a perspective of a media introduction system of an abrasive blasting system including a metering valve for introducing media into a pressurized fluid, according to one embodiment of the present disclosure.

Referring to FIG. 1, a media introduction system for an abrasive blasting system constructed according to the principles of the present disclosure is generally indicated at 10. The media introduction system 10 is used to introduce media (not shown) into a pressurized fluid (e.g., air), which then carries the media and propels or blasts the media against a surface of a component (not shown). The media introduction system 10 is a typical system for which the metering valve of the present disclosure, generally indicated at 100, may be employed with. Other configurations can be used without departing from the scope of the present disclosure.

The media introduction system 10 includes a supply line 12 that fluidly couples a fluid source (not shown), such as an air compressor, of the abrasive blasting system. The fluid source supplies the stream of pressurized fluid. In the illustrated embodiment, the supply line 12 includes a fluid stream inlet 14 configured to be fluidly coupled to the fluid source. The media introduction system 10 includes a pressure vessel or container 20 configured to hold the media (e.g., a supply of media). The supply line 12 divides into two separate lines, a pressure vessel line 16 and a pusher line 18. The pressure vessel line 16 goes to the pressure vessel 20 to pressurize the pressure vessel. The pressure vessel 20 is fluidly coupled to the pusher line 18 via the metering valve 100. The metering valve 100 controls the amount of media that enters the pusher line 18 from the pressure vessel 20. Pressurizing the pressure vessel 20 generally equalizes or balances the pressure between the pressure vessel and the pusher line 18 so that the media can flow generally by gravity (with pressurized fluid) from the pressure vessel, through the metering valve 100 and into the pusher line 18. In the illustrated embodiment, the pusher line 18 includes a fluid stream outlet 22 configured to be fluidly coupled to a nozzle or blast gun (not shown) of the abrasive blasting system. The nozzle or blast gun directs the pressurized fluid and entrained media at the surface of the object to be blasted. The media introduction system 10 may include several valves (e.g., check valves, ball valves, exhaust valves, etc.) to ensure the proper flow of the pressurized fluid through the media introduction system and/or for maintenance purposes. Further details of media introduction systems and the metering valves used therewith can be found in U.S. Publication No. 2021/0252670, the entirety of which is hereby incorporated by reference.

Figure 2:
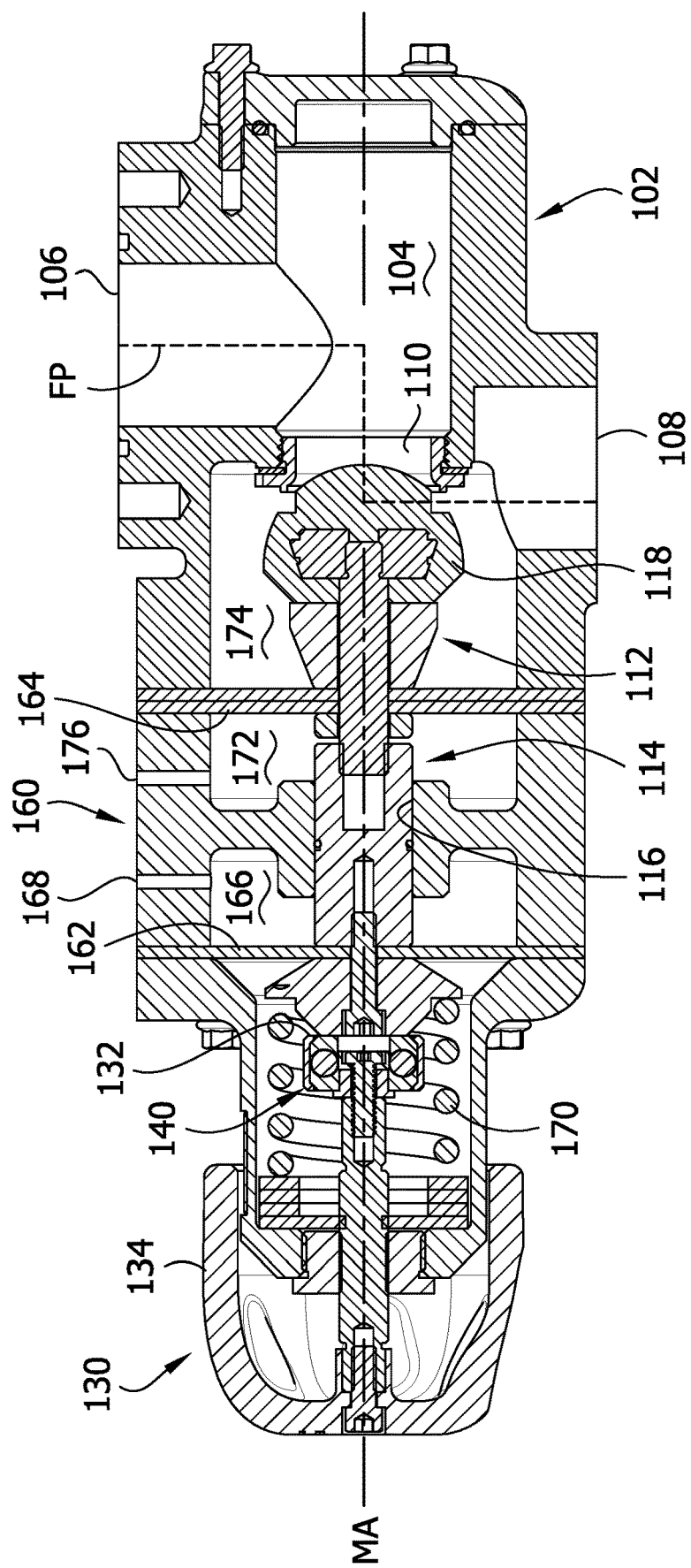
FIG. 2 is a cross-section of the metering valve with a plunger of the metering valve in an open position.

Referring to FIG. 2, one embodiment of a metering valve for use with the media introduction system 10 is generally indicated at 100. The metering valve 100 is used to introduce media into the pressurized fluid and controls the amount of media introduced into the pressurized fluid. The metering valve 100 includes a housing 102 and media passaging 104 extending through the housing. The housing 102 may be a single piece or several pieces joined together. The media passaging 104 includes a media inlet 106 for receiving the media from the pressure vessel 20 and a media outlet 108 for dispensing the media from the metering valve into the pressurized fluid (specifically, the pressurized fluid flowing through the pusher line 18). As shown schematically in FIG. 2, the media passaging 104 defines a flow path FP through the housing 102. The media passaging 104 configured to permit flow of media and pressurized fluid along the flow path FP. The flow path FP extends from the media inlet 106 to the media outlet 108. The metering valve 100 includes a plunger 112 and a valve seat 110. The plunger 112 is movably disposed in the housing 102 and includes a plunger head 118 arranged to engage the valve seat 110 to close the metering valve 100 (e.g., block the flow path FP).

Figure 3:
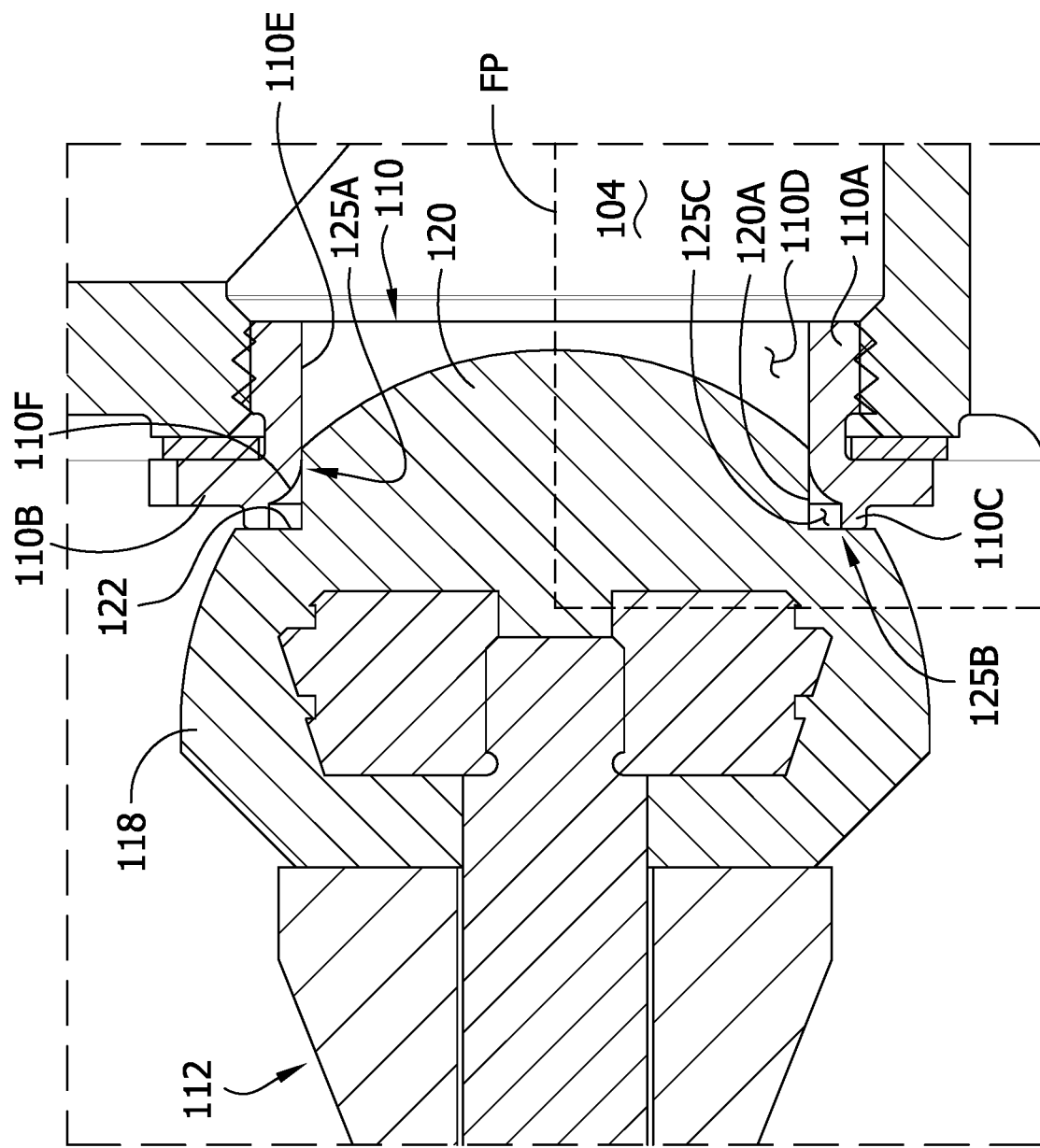
FIG. 3 is an enlarged cross-section of the metering valve with the plunger in a closed position.
Figure 5:
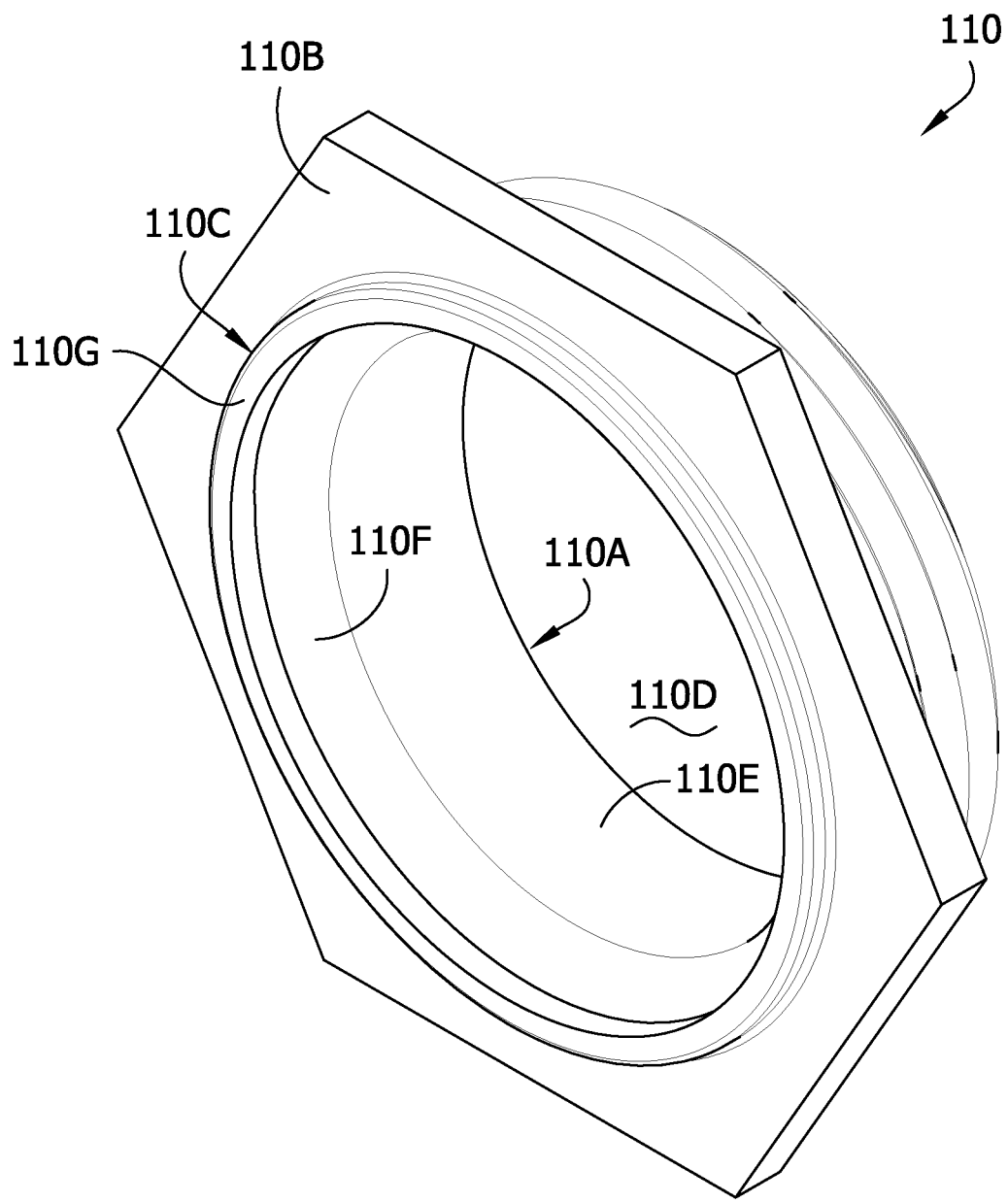
FIG. 5 is a valve seat of the metering valve.

Referring to FIGS. 2, 3, and 5, the valve seat 110 is disposed along the flow path FP between the media inlet 106 and the media outlet 108. The valve seat 110 defines a portion of the media passaging 104. The valve seat 110 defines a bore 110D. The bore 110D makes up part of the media passaging 104. The valve seat 110 has a generally cylindrical body or wall 110A which defines the portion of the media passaging 104. External threads on the wall 110A are used to releasably attach the valve seat 110 to the housing 102. This allows the valve seat 110 to be replaced, such as due to excessive wear due to the media. The valve seat 110 includes a circumferential flange 110B extending radially outward from the cylindrical wall 110A (at one end of the cylindrical wall). The valve seat 110 includes a projection or rib 110C. The rib 110C is positioned to be engaged by the plunger head 118. In the illustrated embodiment, the rib 110C is disposed on the flange 110B and extends proximally therefrom (broadly, the rib projects proximally from a proximally facing end surface of the valve seat 110). As illustrated, the rib 110C includes a proximally-facing surface 110G that defines the proximal end of the valve seat 110. The rib 110C is circumferential and surrounds or encircles the flow path FP. For reasons that will become apparent, the rib 110C is desirably spaced radially outward from an inner surface 110E of the wall 110A. In the illustrated embodiment, the valve seat 110 includes a chamfered or radiused annular portion 110F between the rib 110C and the wall 110A.

Figure 4:
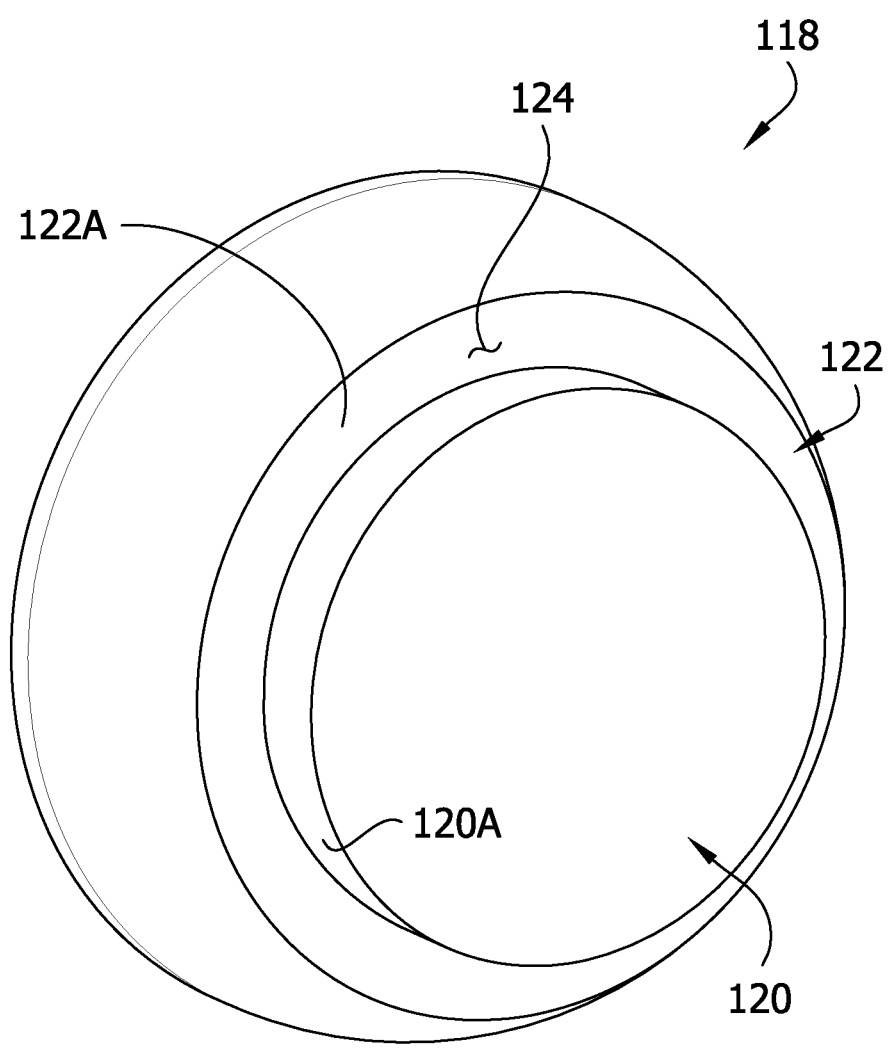
FIG. 4 is a perspective of a plunger head of the metering valve.

Referring to FIGS. 2-4, the plunger 112 is linearly movable within the housing 102 along a movement axis MA. The plunger 112 is movable between a closed position (FIG. 3) and an open position (FIG. 2). In the closed position, the plunger 112 prevents (e.g., blocks) the flow of media and pressurized fluid from the media inlet 106 to the media outlet 108. Specifically, the plunger head 118 forms a seal to prevent the flow of media and pressurized fluid through the media passaging 104. In other words, no media, nor pressurized fluid, can flow through the metering valve 100 when the plunger 112 is in the closed position. In the open position, the plunger 112 does not prevent the flow of media or pressurized fluid from the media inlet 106 to the media outlet 108. Specifically, the plunger head 118 permits the flow of media and pressurized fluid through the media passaging 104. In other words, media (and pressurized fluid) is permitted (e.g., allowed) to flow through the metering valve 100 when the plunger 112 is in the open position.

The plunger 112 includes a plunger shaft 114 slidably mounted within a shaft opening 116 of the housing 102. The plunger head 118 is secured to a distal end of the plunger shaft 114. The plunger head 118 defines a distal end of the plunger 112. The plunger head 118 is movable distally in a distal direction (e.g., along the movement axis MA toward the valve seat 110) toward the closed position and movable proximally in a proximal direction (e.g., along the movement axis MA away from the valve seat) toward the open position. The plunger head 118 includes a plug 120 (broadly, a first portion) and a shoulder 122 (broadly, a second portion). The plug 120 is sized and shaped to be received by the valve seat 110. The plug 120 is sized, shaped, and arranged to be inserted into the bore 110D of the valve seat 110. The plug 120 extends from the shoulder 122. The shoulder 122 is arranged to engage the valve seat 110, specifically the rib 110C thereof. As shown in FIG. 3, the shoulder 122 and the plug 120 define a recess 124 sized, shaped, and arranged to receive a portion of the valve seat 110 when the plunger 112 is in the closed position. The recess 124 extends circumferentially around the plug 120. The plug 120 includes an outer surface 120A and the shoulder 122 includes a distally-facing surface 122A. The outer surface 120A is distal of the distally-facing surface 122A.

Referring to FIG. 3, in the closed position, the plunger head 118 forms a seal with (e.g., engages) the valve seat 110. The plunger head 118 presses distally against the valve seat 110 to sealingly contact (e.g., engage) the valve seat, which prevents flow of media and pressurized fluid from the media inlet 106 to the media outlet 108. The seal formed by the plunger head 118 and the valve seat 110 includes a first sealing interface 125A and a second sealing interface 125B. The first sealing interface 125A is at a first location on the flow path FP and the second sealing interface 125B is at a second location on the flow path. The first and second locations are spaced apart from one another along the flow path FP. In the illustrated embodiment, the second location is downstream along the flow path FP of the first location. In other configurations, the second location may be upstream of the first location. Each of the first and second sealing interfaces 125A, 125B inhibit the flow of media and pressurized fluid therethrough. Desirably, the first and second sealing interfaces 125A, 125B are oriented at an angle relative to one another. This reduces the likelihood of media and pressurized fluid penetrating both sealing interfaces 125A, 125B. In the illustrated embodiment, the first and second sealing interfaces 125A, 125B are oriented generally perpendicular to one another. The first sealing interface 125A is formed by the sealing engagement or contact between the plug 120 and the wall 110A. Specifically, the first sealing interface 125A is formed by the engagement of the outer surface 120A of the plug 120 and the inner surface 110E of the wall 110A. Both the outer surface 120A and the inner surface 110E may be considered sealing surfaces. In the closed position, the plug 120 is disposed in the bore 110D of the valve seat 110. The second sealing interface 125B is formed by the sealing engagement or contact between the shoulder 122 and the rib 110C. Specifically, the second sealing interface 125B is formed by the engagement of the distally-facing surface 122A of the shoulder 122 and the proximally-facing surface 110G of the rib 110C. Both the distally-facing surface 122A and the proximally-facing surface 110G may be considered sealing surfaces. In the closed position, the shoulder 122 presses against the rib 110C of the valve seat 110. Desirably, the rib 110C (specifically, the proximally-facing surface 110G thereof) is narrower than the shoulder 122 (specifically, the distally-facing surface 122A thereof). This results in a better seal between the shoulder 122 and the rib 110C by concentrating the force pushing the plunger head 118 against the valve seat 110 over a small area and permits the shoulder to partially or fully deform around the rib.

In operation, the flow of media is generally stopped by the first sealing interface 125A and the flow of pressurized fluid is generally stopped by the first and second sealing interfaces 125A, 125B. Having the second sealing interface 125B to ensure the flow of pressurized fluid through the media passaging 104 stops significantly prolongs the useful life of the metering valve 100. It has been determined the typical failure mode for conventional metering valves having only one sealing interface begins with the pressurized fluid starting to leak through the sealing interface (e.g., between the conventional plunger head and valve seat). This leads to a domino effect, whereby the leaking pressurized fluid entrains the smallest of the abrasive media, which further deteriorates the sealing interface. As pressurized fluid continues to leak and the sealing interface continues to deteriorate, larger and larger pieces of media are entrained by the leaking pressurized fluid which further deteriorates the sealing interface. This snowball effect continues until the sealing interface, and thereby the conventional media valve, fails completely. The second sealing interface 125B of the media valve 100 of the present disclosure inhibits this snowball effect, by providing a second stop to the flow of pressurized fluid. As a result, even if the pressurized fluid leaks through the first sealing interface 125A, it will not leak past the second sealing interface 125B. This prevents the leaking of pressurized fluid between the plunger head 118 and the valve seat 110 (when the plunger head is in the closed position) that would otherwise entrain media and further deteriorate the seal, as is the case with conventional media valves.

As illustrated in FIG. 3, the plunger head 118 and the valve seat 110 each include a section or portion arranged to be free of a sealing interface (with the other of the plunger head or the valve seat) between the first and second sealing interfaces 125A, 125B along the flow path FP. In other words, the plunger head 118 and the valve seat 110 each include a section or portion arranged to be spaced apart from the other of the plunger head or valve seat when the plunger head is in the closed position. The corner defined by the shoulder 122 and the plug 120 form the portion of the plunger head 118 that is free of sealing interface and the radiused annular portion 110F forms the portion of the valve seat 110 that is free of sealing interface. When the plunger head 118 is in the closed position, the plunger head and the valve seat 110 define a cavity or void 125C therebetween and between the first and second sealing interfaces 125A, 125B. The cavity 125C can collect any media that becomes trapped between the plunger head 118 and the valve seat 110 as the plunger head is moved to the closed position to facilitate the formation of strong first and second sealing interfaces 125A, 125B between the plunger head and valve seat. In other words, the cavity 125C provides a place of media to go instead of the media becoming trapped between the sealing surfaces of the plunger head 118 and the valve seat 110 and reducing the quality of the seal formed by the plunger head and the valve seat.

In the open position, the plunger head 118 is spaced apart from the valve seat 110 to permit the flow of pressurized fluid and media from the media inlet 106 to the media outlet 108 in the media passaging 104 along the flow path FP. Generally speaking, the sealing surfaces of the plunger head 118 and the valve seat 110 are spaced apart from one another when the plunger head is in the open position. In particular, the shoulder 122 of the plunger head 118 is spaced apart from the rib 110C of the valve seat 110. Likewise, the outer surface 120A of the plug 120 is spaced apart (axially along the movement axis MA) from the inner surface 110E of the valve seat 110.

The plunger head 118 may be made of a polymeric material. In one embodiment, the polymeric material has a hardness (e.g., durometer) equal to or greater than about 70 Shore A, or even more desirably, greater than or equal to about 85 Shore A, or even more desirably about 90 Shore A (+/−5 Shore A), to be able to withstand the abrasive effects of the media. Desirably, the polymeric material of the plunger head 118 has inherent flexibility (e.g., resilient compressibility, pliability, deformability) which facilitates the forming of the seal when the plunger head 118 is pressed against the valve seat 110. For example, the polymeric material may have a tensile strength that is less than or equal to about 2500 psi (the lower the tensile strength the more compressible). In one embodiment, the polymeric material forming the plunger head 118 is a high-strength hardened (e.g., cured) urethane. In the illustrated embodiment, the plunger head 118 comprises a polymeric material on a non-polymeric substrate (e.g., overmolded).

Referring back to FIG. 2, the distance the plunger 112 moves between the open and closed positions is adjustable, as the larger the distance (e.g., the further the plunger moves proximally from the closed position), the greater the amount of media introduced into the pressurized fluid. The metering valve 100 includes a plunger adjuster 130 that sets the amount of media the metering valve introduces into the pressurized fluid in the pusher line 18 by setting the distance the plunger 112 moves between the open and closed positions. The plunger adjuster 130 includes a bracing surface 132 that braces the plunger 112, when the plunger is in the open position (FIG. 2), to set the distance. The plunger 112 is in the open position when the plunger is braced against the bracing surface 132 and is inhibited from moving farther in the proximal direction (e.g., away from the valve seat 110). In the illustrated embodiment, the plunger adjuster 130 includes a bearing 140 that defines the bracing surface 132. The plunger adjuster 130 includes an actuator or knob 134 that is actuated (e.g., manually moved) to change the distance. The plunger adjuster 130 is threadably attached to the housing 102 such that movement (e.g., rotation) of the actuator 134 moves the bracing surface 132 along the movement axis MA. Further details on plunger adjusters may be found in U.S. Publication No. 2021/0252670, which has already been incorporated by reference in its entirety.

Still referring to FIG. 3, the metering valve 100 may include a valve actuator 160 operatively coupled to the plunger 112 and configured to move or facilitate the movement of the plunger 112 into the open and closed positions. Broadly, the valve actuator 160 is configured to move the plunger 112 to at least one of the open position or the closed position. Desirably, the valve actuator 160 can move the plunger 112 to both the open and closed positions. The valve actuator 160 includes first and second diaphragms 162, 164 (e.g., elastomeric diaphragms) spanning the interior of the housing 102 (broadly, at least one diaphragm). Each diaphragm 162, 164 is coupled (e.g., operatively coupled) to the plunger 112 and is configured to move the plunger to at least one of the open position or the closed position. Together the housing 102 and first diaphragm 162 define a first or pressure open chamber 166. The first chamber 166 is fluidly connected to a source of pressurized fluid (e.g., air) through a port 168. The source of pressurized fluid may be the same as or different from the fluid source that provides the pressurized fluid flowing through the supply line 12. The addition of pressurized fluid into the first chamber 166 moves the first diaphragm 162 and plunger 112 proximally, away from the valve seat 110, toward the plunger adjuster 130 and to the open position (e.g., the metering valve 100 is pressurized open). In the illustrated embodiment, the valve actuator 160 includes a spring 170 that biases the plunger 112 toward the closed position. The addition of pressurized fluid into the first chamber 166 is sufficient to overcome the biasing force from the spring 170. When the pressurized fluid is exhausted from the first chamber 166, the spring 170 moves the plunger 112 distally to the closed position. Together the housing 102 and second diaphragm 164 define a second or pressure close chamber 172 and a media chamber 174. The media camber 174 is, broadly, part of the media passaging 104. The second chamber 172 is used to move the plunger 112 to the closed position. The second chamber 172 is fluidly connected to a source of pressurized fluid (e.g., air) through a port 176, similar to the first chamber 166 as discussed above. The addition of pressurized fluid into the second chamber 172 moves the second diaphragm 164 and plunger 112 distally toward the valve seat 110 and to the closed position. The plunger 112 moves distally until the plunger head 118 engages the valve seat 110 in the closed position (e.g., the metering valve 100 is pressurized closed). When the pressurized fluid is exhausted from the second chamber 172 (e.g., through the port 176), the plunger 112 is free to move distally to the open position. Pressure received by the media chamber 174 during the normal operation of the media introduction system 10 may also facilitate or assist in the movement of the plunger 112 to the open position. Pressurizing the second chamber 172 can move the plunger 112 toward the closed position regardless of if the media chamber 174 is pressurized due to the normal operation of the system 10.

In the open position, a controlled amount of media flows between the plunger head 118 and the valve seat 110, out the media outlet 108 and into the pressurized fluid flowing through the pusher line 18.

It will be apparent that modifications and variations are possible without departing from the scope of the disclosure defined in the appended claims.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products without departing from the scope of the claims, it is intended that all matter contained in the above description and shown in the accompanying drawings shall be interpreted as illustrative and not in a limiting sense.

What is claimed is:

1. A metering valve for introducing media into a pressurized fluid, the metering valve comprising:
 a housing;
 a media passaging extending through the housing, the media passaging including a media inlet for receiving media and a media outlet for dispensing media toward the pressurized fluid, the media passaging defining a flow path extending from the media inlet to the media outlet and configured to permit flow of media along the flow path; and
 a plunger movably disposed within the housing, the plunger movable between a closed position in which the plunger forms a seal including a first sealing interface and a second sealing interface downstream of the first sealing interface along the flow path to prevent flow of media through the media passaging and an open position in which the plunger permits flow of media through the media passaging, the plunger being configured to form the first sealing interface before forming the second sealing interface as the plunger moves toward the closed position.

2. The metering valve of claim 1, wherein the first sealing interface and the second sealing interface are oriented at an angle relative to one another.

3. The metering valve of claim 2, wherein the first sealing interface and the second sealing interface are oriented generally perpendicular to one another.

4. The metering valve of claim 1, wherein the first and second sealing interfaces are spaced apart from one another along the flow path.

5. The metering valve of claim 1, wherein the plunger is configured to form the first sealing interface via radial compression and is configured to form the second sealing interface via axial compression.

6. The metering valve of claim 1, further comprising a valve seat defining a portion of the media passaging, the plunger configured to engage the valve seat via radial compression to form the first sealing interface and to engage the valve seat via axial compression to form the second sealing interface.

7. The metering valve of claim 6, wherein the plunger and the valve seat are configured to define a cavity between the first and second sealing interfaces along the flow path when the plunger is in the closed position.

8. The metering valve of claim 7, wherein the valve seat has a radiused annular portion configured to bound the cavity.

9. The metering valve of claim 1, further comprising a valve seat defining a portion of the media passaging, wherein the plunger is configured to engage the valve seat to form the first and second sealing interfaces when the plunger is in the closed position.

10. The metering valve of claim 9, wherein a first portion of the plunger is configured to engage the valve seat to form the first sealing interface.

11. The metering valve of claim 10, wherein a second portion of the plunger is configured to the valve seat to form the second sealing interface.

12. The metering valve of claim 11, wherein the first portion of the plunger includes a plug sized and shaped to be inserted into a bore of the valve seat.

13. The metering valve of claim 12, wherein the second portion of the plunger includes a face arranged to face in the direction the plunger moves from the open position toward the closed position.

14. The metering valve of claim 1, wherein the plunger is configured to increase an area of the first sealing interface after the first sealing interface is formed as the plunger moves farther toward the closed position to form the second sealing interface.

15. A metering valve for introducing media into a pressurized fluid, the metering valve comprising:
a housing;
media passaging extending through the housing, the media passaging including a media inlet for receiving the media from a supply of media and a media outlet for dispensing media from the metering valve into the pressurized fluid;
a valve seat defining a portion of the media passaging; and
a plunger movable in the housing and including a plunger head, the plunger movable between a closed position in which the plunger head sealingly contacts the valve seat to prevent flow of media through the media passaging and an open position in which the plunger head is spaced apart from the valve seat to permit media to flow through the valve passaging, the plunger being movable distally to move the plunger head toward the valve seat to the closed position, the plunger head including a first portion configured to engage the valve seat to form a first sealing interface with the valve seat and a second portion configured to engage the valve seat to form a second sealing interface with the valve seat, the first portion being arranged relative to the second portion such that the first portion engages the valve seat before the second portion engages the valve seat as the plunger moves distally to the closed position;
wherein the first portion of the plunger head is configured to engage the first sealing surface of the valve seat in radial compression to form the first sealing interface and the second portion of the plunger head is configured to engage the second sealing surface of the valve seat in axial compression to form the second sealing interface.

16. The metering valve of claim 15, wherein the first portion of the plunger head is configured to engage a first sealing surface of the valve seat to form the first sealing interface and the second portion of the plunger is configured to engage a second sealing surface of the valve seat to form the second sealing interface.

17. The metering valve of claim 16, wherein the first portion of the plunger head is configured such that an area of engagement between the first portion and the first sealing surface that forms the first sealing interface increases after the first sealing interface is formed as the plunger moves farther toward the closed position.

18. The metering valve of claim 17, wherein the first sealing surface of the valve seat defines a bore, and wherein the first portion of the plunger head is sized and shaped to be inserted into the bore as the plunger moves distally toward the closed position.

19. The metering valve of claim 18, wherein the plunger head and the valve seat are configured to define a void between the first and second sealing interfaces when the plunger head is in the closed position.

20. The metering valve of claim 19, wherein the valve seat has a chamfer proximal of the first sealing surface of the valve seat, the chamfer being configured to bound the void.

21. A metering valve for introducing media into a pressurized fluid, the metering valve comprising:
a housing;
media passaging extending through the housing, the media passaging including a media inlet for receiving media and a media outlet for dispensing media toward the pressurized fluid, the media passaging defining a flow path extending from the media inlet to the media outlet and configured to permit flow of media along the flow path;
a plunger movably disposed within the housing, the plunger movable between a closed position in which the plunger forms a seal including a first sealing interface and a second sealing interface to prevent flow of media through the media passaging and an open position in which the plunger permits flow of media through the media passaging, the plunger being configured to form the first sealing interface before forming the second sealing interface as the plunger moves toward the closed position, the plunger being moveable a distance between the open and closed positions; and
a plunger adjuster configured to set the distance by operatively bracing the plunger to limit movement of the plunger as the plunger moves from the closed position to the open position, the plunger adjuster configured to change the distance to adjust an amount of media flow permitted in the media passaging by the plunger in the open position.

22. The metering valve of claim 21, wherein the second sealing interface is downstream of the first sealing interface along the flow path.

23. The metering valve of claim 22, wherein the first sealing interface is a cylindrical interface, and wherein the plunger is configured to form the second sealing interface via axial compression.

24. The metering valve of claim 23, further comprising a valve seat defining a portion of the media passaging, the valve seat including a cylindrical sealing surface, the plunger configured to engage the cylindrical sealing surface of the valve seat to form the first sealing interface and to engage the valve seat via axial compression to form the second sealing interface.

25. The metering valve of claim 24, wherein the plunger and the valve seat are configured to define a void between the first and second sealing interfaces when the plunger is in the closed position.

26. The metering valve of claim 24, wherein the plunger adjuster includes a bracing surface arranged to engage and brace the plunger in the open position, the plunger adjuster being configured to move the bracing surface relative to the housing to set the distance, the plunger being movable away from the bracing surface to the closed position.

27. The metering valve of claim 26, wherein the plunger adjuster includes an actuator configured to be actuated to move the bracing surface to change the distance.

28. The metering valve of claim 27, wherein the plunger adjuster includes a bearing operatively disposed between the actuator and the plunger.

29. The metering valve of claim 28, wherein the bearing forms the bracing surface.

30. The metering valve of claim 21, wherein the first sealing interface and the second sealing interface are oriented generally perpendicular to one another.

31. The metering valve of claim 21, wherein the plunger is configured such that an area of the first sealing interface increases as the plunger moves farther toward the closed position.

* * * * *